United States Patent
Caldarone et al.

(10) Patent No.: US 10,248,970 B1
(45) Date of Patent: Apr. 2, 2019

(54) VIRTUAL ITEM PROMOTIONS VIA TIME-PERIOD-BASED VIRTUAL ITEM BENEFITS

(71) Applicant: KABAM INC., San Francisco, CA (US)

(72) Inventors: Michael C. Caldarone, Palo Alto, CA (US); Stephanie K. Schultz, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 665 days.

(21) Appl. No.: 13/886,102

(22) Filed: May 2, 2013

(51) Int. Cl.
  *G06Q 30/02* (2012.01)
(52) U.S. Cl.
  CPC .............................. *G06Q 30/0264* (2013.01)
(58) Field of Classification Search
  None
  See application file for complete search history.

(56) References Cited

U.S. PATENT DOCUMENTS

| | | | |
|---|---|---|---|
| 5,933,813 A | 8/1999 | Teicher et al. | 705/26 |
| 5,964,660 A | 10/1999 | James et al. | 463/1 |
| 6,850,900 B1 | 2/2005 | Hare | |
| 6,928,474 B2 | 8/2005 | Venkatesan | 709/224 |
| 7,076,453 B2 | 7/2006 | Jammes et al. | 705/26 |
| 7,533,336 B2 | 5/2009 | Jaffe et al. | 715/243 |
| 7,660,740 B2 | 2/2010 | Boone et al. | 705/26 |
| 7,682,239 B2 | 3/2010 | Friedman et al. | 463/16 |
| 8,016,668 B2 | 9/2011 | Hardy et al. | 463/29 |
| 8,050,976 B2 | 11/2011 | Staib | |
| 8,157,635 B2 | 4/2012 | Hardy et al. | 463/17 |
| 8,187,101 B2 | 5/2012 | Herrmann et al. | 463/42 |
| 8,221,223 B2 * | 7/2012 | Walker | G07F 17/32 463/1 |
| 8,226,472 B2 | 7/2012 | Van Luchene | 463/25 |
| 8,272,956 B2 | 9/2012 | Kelly et al. | 463/31 |

(Continued)

OTHER PUBLICATIONS

Juho Hamari, "Game design as marketing: How game mechanics create demand for virtual goods", available on vol. 5, Issue 1, 2010, retrieved from Int. Journal of Business Science and Applied Management—http://www.business-and-management.org/library/2010/5_1--14-29-Hamari,Lehdonvirta.pdf , on May 26, 2015.*

(Continued)

*Primary Examiner* — Rutao Wu
*Assistant Examiner* — Alfred H Tsui
(74) *Attorney, Agent, or Firm* — Sheppard Mullin Richter & Hampton LLP

(57) ABSTRACT

An approach to facilitating virtual item promotions via time-period-based virtual item benefits is provided. A store interface may present offers to users of a game space to purchase item instances of virtual items associated with in-space benefits. Item instances of a first virtual item may be configured to be activated by the users in the game space to obtain one or more first in-space benefits. A promotion that is conducted for the game space may be managed such that, during a first promotion time period, item instances of the first virtual item purchased through the store interface may be modified instances of the first virtual item. The modified instances may be configured to be activated by the users in the game space during a second promotion time period to obtain one or more second in-space benefits.

20 Claims, 7 Drawing Sheets

(56) References Cited

U.S. PATENT DOCUMENTS

| | | | |
|---|---|---|---|
| 8,282,491 | B2 | 10/2012 | Auterio et al. ................ 463/42 |
| 8,287,383 | B1 | 10/2012 | Etter et al. ..................... 463/42 |
| 8,287,384 | B2 | 10/2012 | Auterio et al. ................ 463/42 |
| 8,292,743 | B1 | 10/2012 | Etter et al. ..................... 463/42 |
| 8,332,260 | B1 | 12/2012 | Mysen et al. ................. 705/7.35 |
| 8,348,767 | B2 | 1/2013 | Mahajan et al. ............... 463/42 |
| 8,360,858 | B2 | 1/2013 | LaRocca et al. .............. 463/25 |
| 8,360,867 | B2 | 1/2013 | Van Luchene ................. 463/25 |
| 8,366,544 | B2 | 2/2013 | Walker et al. ................. 463/29 |
| 8,401,913 | B2 | 3/2013 | Alivandi ..................... 705/26.1 |
| 8,777,754 | B1 | 7/2014 | Santini |
| 8,920,243 | B1 | 12/2014 | Curtis et al. ................... 463/42 |
| 9,138,639 | B1 | 9/2015 | Ernst |
| 9,345,974 | B1 | 5/2016 | Santini |
| 2002/0059397 | A1 | 5/2002 | Feola |
| 2002/0095327 | A1 | 7/2002 | Zumel et al. ................... 705/10 |
| 2003/0032476 | A1 | 2/2003 | Walker et al. ................. 463/25 |
| 2003/0102625 | A1 | 6/2003 | Katz et al. ................. 273/138.1 |
| 2004/0068451 | A1 | 4/2004 | Lenk et al. ..................... 705/28 |
| 2004/0215524 | A1 | 10/2004 | Parkyn ........................... 705/26 |
| 2004/0267611 | A1 | 12/2004 | Hoerenz ......................... 705/14 |
| 2005/0114223 | A1 | 5/2005 | Schneider ...................... 705/26 |
| 2005/0165686 | A1 | 7/2005 | Zack |
| 2006/0200370 | A1 | 9/2006 | Ratliff |
| 2008/0032787 | A1 | 2/2008 | Low et al. ...................... 463/29 |
| 2008/0154798 | A1 | 6/2008 | Valz ............................. 705/400 |
| 2008/0234043 | A1 | 9/2008 | McCaskey et al. ............ 463/29 |
| 2008/0275786 | A1 | 11/2008 | Gluck ............................. 705/14 |
| 2009/0011812 | A1 | 1/2009 | Katz et al. ...................... 463/16 |
| 2009/0017886 | A1 | 1/2009 | McGucken ....................... 463/1 |
| 2009/0204907 | A1 | 8/2009 | Finn et al. ..................... 715/757 |
| 2009/0210301 | A1 | 8/2009 | Porter et al. ................... 705/14 |
| 2009/0234710 | A1 | 9/2009 | Belgaied Hassine et al. ............ 705/10 |
| 2009/0247282 | A1 | 10/2009 | Cheng |
| 2010/0035689 | A1 | 2/2010 | Altshuler |
| 2010/0050088 | A1 | 2/2010 | Neustaedter et al. ........ 715/745 |
| 2010/0094841 | A1 | 4/2010 | Bardwil ......................... 707/705 |
| 2010/0174593 | A1 | 7/2010 | Cao et al. ................... 705/14.12 |
| 2010/0198653 | A1 | 8/2010 | Bromenshenkel et al. .... 705/10 |
| 2010/0228606 | A1 | 9/2010 | Walker et al. ................. 705/10 |
| 2010/0241491 | A1 | 9/2010 | Eglen et al. .................... 705/10 |
| 2010/0241492 | A1 | 9/2010 | Eg Len et al. ................. 705/10 |
| 2011/0092273 | A1 | 4/2011 | Cerbini ........................... 463/25 |
| 2011/0113353 | A1 | 5/2011 | Koh et al. ..................... 715/760 |
| 2011/0145040 | A1 | 6/2011 | Zahn ............................ 705/7.33 |
| 2011/0300923 | A1 | 12/2011 | Van Luchene ................. 463/25 |
| 2012/0011002 | A1 | 1/2012 | Crowe et al. .............. 705/14.66 |
| 2012/0040743 | A1 | 2/2012 | Auterio et al. ................ 463/25 |
| 2012/0040761 | A1 | 2/2012 | Auterio et al. ................ 463/42 |
| 2012/0042282 | A1 | 2/2012 | Wong ........................... 715/811 |
| 2012/0047002 | A1 | 2/2012 | Patel |
| 2012/0059730 | A1 | 3/2012 | Jensen |
| 2012/0101886 | A1 | 4/2012 | Subramanian et al. ... 705/14.23 |
| 2012/0109785 | A1 | 5/2012 | Karlsson ....................... 705/27.1 |
| 2012/0130856 | A1* | 5/2012 | Petri ................... G06Q 30/0623 705/26.61 |
| 2012/0142429 | A1 | 6/2012 | Muller ............................ 463/42 |
| 2012/0166380 | A1 | 6/2012 | Sridharan et al. .............. 706/52 |
| 2012/0178529 | A1 | 7/2012 | Collard et al. ................. 463/31 |
| 2012/0197874 | A1 | 8/2012 | Zatkin et al. ................. 707/722 |
| 2012/0203669 | A1 | 8/2012 | Borsch et al. ............... 705/27.1 |
| 2012/0215667 | A1 | 8/2012 | Ganz et al. .................. 705/27.2 |
| 2012/0221430 | A1 | 8/2012 | Naghmouchi et al. ...... 705/26.7 |
| 2012/0231891 | A1 | 9/2012 | Watkins, Jr. et al. ........... 463/43 |
| 2012/0245988 | A1 | 9/2012 | Pace et al. ................. 705/14.25 |
| 2012/0289315 | A1 | 11/2012 | Van Luchene ................. 463/25 |
| 2012/0289330 | A1 | 11/2012 | Leydon et al. ................. 463/31 |
| 2012/0289346 | A1 | 11/2012 | Van Luchene ................. 463/42 |
| 2012/0295699 | A1 | 11/2012 | Reiche ........................... 463/29 |
| 2012/0296716 | A1 | 11/2012 | Barbeau et al. ........... 705/14.13 |
| 2012/0309504 | A1 | 12/2012 | Isozaki ........................... 463/25 |
| 2012/0330785 | A1 | 12/2012 | Hamick et al. ............ 705/26.41 |
| 2013/0005466 | A1 | 1/2013 | Mahajan |
| 2013/0006736 | A1 | 1/2013 | Bethke et al. ............. 705/14.12 |
| 2013/0012304 | A1 | 1/2013 | Cartwright ..................... 463/25 |
| 2013/0013459 | A1 | 1/2013 | Kerr et al. .................... 705/27.1 |
| 2013/0090173 | A1 | 4/2013 | Kislyi ............................ 463/43 |
| 2013/0124361 | A1 | 5/2013 | Bryson |
| 2013/0226733 | A1* | 8/2013 | Evans et al. .............. 705/26.25 |
| 2014/0033262 | A1 | 1/2014 | Anders |
| 2014/0067526 | A1 | 3/2014 | Raju |
| 2014/0067544 | A1 | 3/2014 | Klish et al. ................ 705/14.66 |
| 2014/0073420 | A1 | 3/2014 | Matthew |
| 2014/0087882 | A1 | 3/2014 | Matsumoto |
| 2014/0089048 | A1 | 3/2014 | Bruich ......................... 705/7.32 |
| 2014/0100020 | A1* | 4/2014 | Carroll et al. ................. 463/25 |
| 2014/0157314 | A1 | 6/2014 | Roberts |
| 2014/0243072 | A1 | 8/2014 | Santini et al. ................. 463/20 |
| 2014/0337259 | A1 | 11/2014 | Lamb |
| 2015/0019349 | A1 | 1/2015 | Milley |
| 2015/0031442 | A1 | 1/2015 | Colvin |

OTHER PUBLICATIONS

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshot access date May 24, 2012 2:19 PM, 1 page.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts—Part 1&oldid=399597, http://lotro-wiki.com/index.php?title=Quest:A_Little_Extra_Never_Hurts—Part 2&oldid=399366, http://lotro-wiki.com/index.php?title=Getting_Started&oldid=349681, Links are to used articles, 33 pages.

"Behavioural Analytics & Campaigning", http://lotaris.com/behavioural_analytics_and_Compaigning.htm, screenshot access date May 24, 2012 2:21 PM, 1 page.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Clash of Clans". Wikipedia.org. Online. Accessed via the Internet. Accessed Aug. 9, 2014. <URL: http://en.wikipedia.org/wiki/Clash_of_Clans>, 3 pages.

"Gem calculation formulas". forum.supercell.net. Online. Accessed via the Internet. Accessed Aug. 9, 2014. <URL: http//forum.supercell.net/showthread.php/23028-Gem-calculation-formulas>, 3 pages.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

"Building Structures". War2.warcraft.org. Online. Accessed via the Internet. Accessed Aug. 9, 2014. <URL: http://war2.warcraft.org/strategy/verybasics/building.shtml>, 3 pages.

City Coins. CityVille Wikia. Online. Accessed via the Internet. Accessed Aug. 9, 2014. <URL: http://cityville.wikia.com/wiki/City_Coins>, 2 pages.

Gaia "Black Friday Bundle" available on Nov. 23, 2011, from http://www.gaiaonline.com/forum/community-announcements/black-friday-big-bundies-rare-items/t.76127933/, 5 pages.

(56) References Cited

OTHER PUBLICATIONS

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

TFWiki "teamfortress wiki" available Nov. 5, 2011 retrieved from https://web.archive.org/web/20111105044256/http://wiki.teamfortress.com/wiki/Loadout, 4 pages.

MMO Site "Rose Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

Lotro-Wiki.com, "Hunting Lodge (Archet)" with "Introduction Quest", Aug. 14, 2012, https://lotrouwiki.com/index.php?title=Hunting_Lodge_(Archet)&oldid=495361 and <https://lotrowiki.com/index.php?title=Introduction_Quests&oldid=358308> (6 pages).

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=OuestA_Little_Extra_Never_Hurts—Part_2&oldid=399366>, <http://lotrowiki.com/index.php?title=Getting_Started&oldid=349681 >. Links are used articles. (7 pgs) Feb. 26, 2014.

"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_--_Part_1 &oldid=399597> (28 pgs).

Aeria Games GmbH, "First Time Buyer—Aug.", Aug. 10, 2010, <http://grandfantasia.aeriagames.com/news/5600/first-time-buyeraugust> (2 pgs).

* cited by examiner

VIRTUAL ITEM PROMOTIONS VIA TIME-PERIOD-BASED VIRTUAL ITEM BENEFITS

FIELD OF THE DISCLOSURE

This disclosure relates generally to virtual item promotions via time-period-based virtual item benefits.

BACKGROUND

Traditional sales promotions such as discounting of prices may be utilized for virtual items to boost short-term profits associated with the virtual items. However, while traditional sales promotions may have the effect of boosting short-term profits, such promotions may have lingering long-term effects relating to profitability from the virtual items or perceived values of the virtual items by users. For example, discounting virtual item prices generally provides a temporary spike in sales, and then causes a longer period of decreased sales once the regular virtual item prices are restored. Thus, among other issues, the negative effects of direct discounting of virtual item prices may outweigh short-term gains.

SUMMARY

One aspect of the disclosure relates to a system configured to facilitate virtual item promotions via time-period-based virtual item benefits, in accordance with one or more implementations. In exemplary implementations, a promotion may be conducted for a game space such that, during a first promotion time period, item instances of at least one virtual item that are purchased by users in the game space may be modified instances of the virtual item. These modified instances may, for example, provide different in-space benefits than the in-space benefits associated with regular instances of the virtual item if the modified instances are activated during a second promotion time period. In this way, the different in-space benefits that may be obtained by a user upon activation of a modified instance of the virtual item may provide an incentive for users to purchase modified instances of the virtual item in the short term without lingering long-term negative effects associated with traditional sales promotions.

In some implementations, the system may include one or more servers. The server(s) may be configured to communicate with one or more client computing platforms according to a client/server architecture. The users may access the system and/or a virtual space (e.g., a virtual world, a game space, etc.) via the client computing platforms.

The server(s) may be configured to execute one or more computer program modules to facilitate virtual item promotions via time-period-based virtual item benefits. The computer program modules may include one or more of a game module, an item manager module, a store module, a promotion module, an exchange module, a benefit module, and/or other modules. In some implementations, the client computing platforms may be configured to execute one or more computer program modules that are the same as or similar to the computer program modules of the server(s) to facilitate virtual item promotions via time-period-based virtual item benefits.

The game module may be configured to execute a game instance of a game space. The game module may be configured to facilitate presentation of views of the game space to users. The game space may be configured to facilitate interaction of the users with the game space and/or each other by performing operations in the game space in response to commands received from the users.

The item manager module may be configured to generate virtual items associated with in-space benefits. The generated virtual items may include a first virtual item, virtual containers, or other virtual items. For example, item instances of the first virtual item may be configured to be activated by the users in the game space to obtain one or more first in-space benefits.

The store module may be configured to present a store interface to the users. The store interface may present offers to the users to purchase item instances of the virtual items associated with in-space benefits. The presented offers may, for example, include offers to purchase one or more of the item instances of the first virtual item.

The promotion module may be configured to manage a promotion that is conducted for the game space. The promotion module may be configured to manage the promotion such that, during a first promotion time period, item instances of the first virtual item purchased through the store interface are modified instances of the first virtual item. The modified instances may be configured to be activated by the users in the game space during a second promotion time period to obtain one or more second in-space benefits. The one or more second in-space benefits may be different from the one or more first in-space benefits.

In certain implementations, the promotion module may be configured such that the first promotion time period is overlapping with the second promotion time period. In various implementations, the promotion module may be configured such that the first promotion time period is overlapping with the second promotion time period.

In some implementations, the exchange module may be configured to provide at least some of the item instances of the first virtual item to the users that requested an item instance of the first virtual item in exchange for consideration associated with a price of an item instance of the first virtual item. The exchange module may be configured to provide at least some of the modified instances to the users that requested a modified instance of the first virtual item in exchange for consideration associated with a price of a modified instance of the first virtual item.

The benefit module may be configured to provide the one or more second in-space benefits to a user within the game space responsive to a determination that at least one of the modified instances is activated by the user during the second promotion time period.

In some implementations, the promotion module may be configured such that the modified instances are configured to be activated by the users in the game space during time periods other than the second promotion time period to obtain the one or more first in-space benefits. The benefit module may be configured to provide the one or more first in-space benefits to the user responsive to a determination that at least one of the modified instances is activated by the user during a time period other than the second promotion time period.

In certain implementations, the promotion module may be configured such that the modified instances are configured to be activated by the users in the game space during time periods other than the second promotion time period to obtain the one or more third in-space benefits. The one or more third in-space benefits may be different than the one or more first in-space benefits and the one or more second in-space benefits. The benefit module may be configured to provide the one or more third in-space benefits to the user responsive to a determination that at least one of the modified instances is activated by the user during a time period other than the second promotion time period.

In various implementations, the store module may be configured such that the virtual items include virtual containers. The virtual containers may include a first virtual container. Individual ones of container instances of the first virtual container may be configured to be activated by the users in the game space to obtain a modified instance of the first virtual item and one or more item instances of other virtual items. In some implementations, the other virtual items may include the first virtual item such that individual ones of the container instances are configured to be activated by the users in the game space to obtain a plurality of modified instances of the first virtual item. In certain implementations, the other virtual items may not include the first virtual item.

In various implementations, the exchange module may be configured to provide at least some of the container instances of the first virtual container to the users that requested a container instance of the first virtual container in exchange for consideration associated with a price of a container instance of the first virtual container.

In some implementations, the exchange module may be configured such that the price of a container instance of the first virtual container is different from a total sum of prices of a modified instance of the first virtual item and the one or more item instances of the other virtual items.

In certain implementations, the exchange module may be configured to provide one or more additional item instances of the virtual items to the users that requested a container instance of the first virtual container responsive to a determination that requests for the at least some of the container instances are initiated during a third promotion time period.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
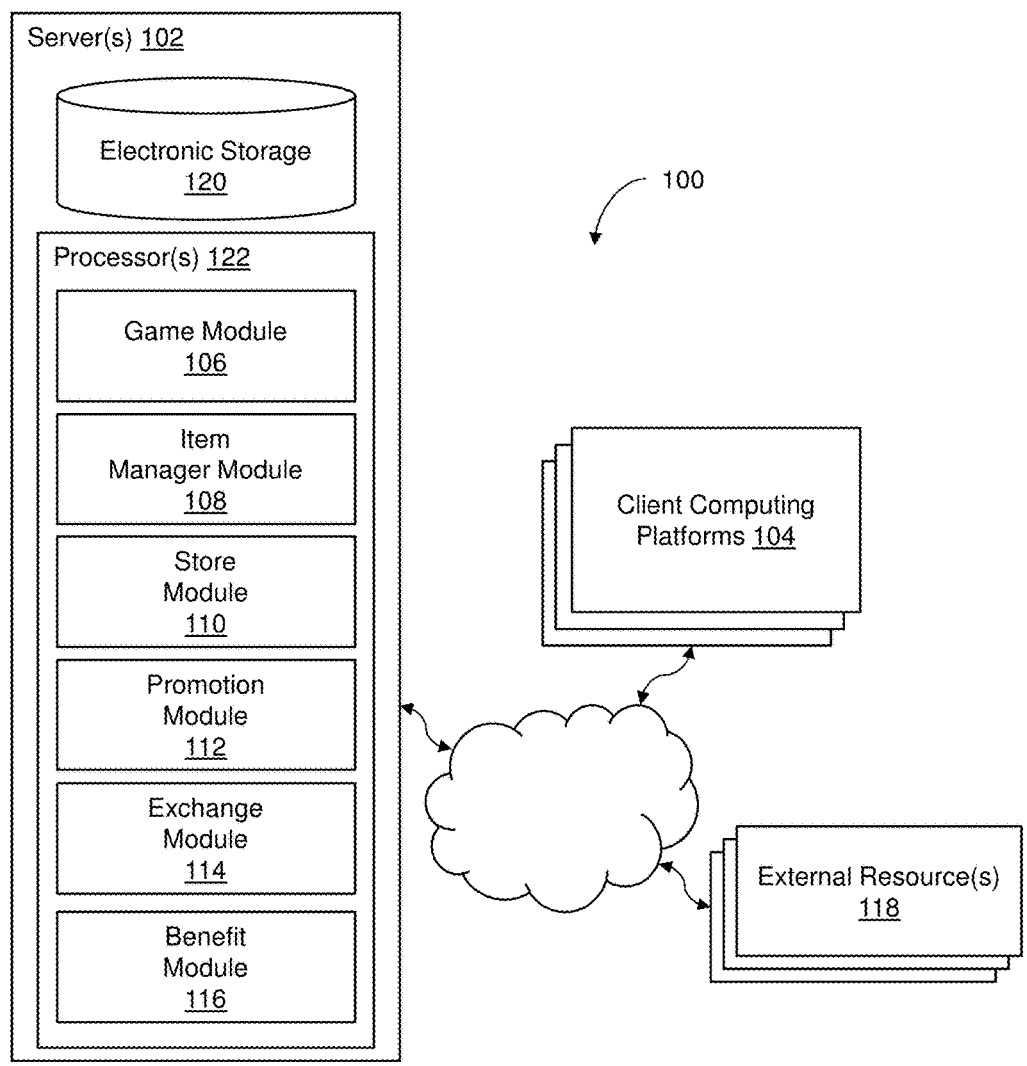
FIG. 1 illustrates a system configured to facilitate virtual item promotions via time-period-based virtual item benefits, in accordance with one or more implementations.

FIG. 1 illustrates a system 100 configured to facilitate virtual item promotions via time-period-based virtual item benefits, in accordance with one or more implementations. In exemplary implementations, a promotion may be conducted for a game space such that, during a first promotion time period, item instances of at least one virtual item that are purchased by users in the game space may be modified instances of the virtual item. These modified instances may, for example, provide different in-space benefits than the in-space benefits associated with regular instances of the virtual item if the modified instances are activated during a second promotion time period. These different in-space benefits may include increased in-space benefits, different types of in-space benefits, decreased in-space benefits (e.g., in exchange for a lower price point of a modified instance or other incentive), etc.

In various implementations, if the modified instances are activated during a time period other than the second promotion time period, the modified instances may provide the in-space benefits associated with the regular instances. In some implementations, the modified instances cannot be activated during a time period other than the second promotion time period (e.g., the modified instances may become unusable to obtain in-space benefits, the modified instances may be removed from the users' "inventories," etc.). In this way, the different in-space benefits that may be obtained by a user upon activation of a modified instance of the virtual item may provide an incentive for users to purchase modified instances of the virtual item in the short term without lingering long-term negative effects associated with traditional sales promotions.

In some implementations, system 100 may include one or more servers 102. Server(s) 102 may be configured to communicate with one or more client computing platforms 104 according to a client/server architecture. The users may access system 100 and/or a virtual space (e.g., a virtual world, a game space, etc.) via client computing platforms 104.

Server(s) 102 may be configured to execute one or more computer program modules to facilitate virtual item promotions via time-period-based virtual item benefits. The computer program modules may include one or more of a game module 106, an item manager module 108, a store module 110, an exchange module 114, a promotion module 112, a benefit module 116, and/or other modules. In some implementations, client computing platforms 104 may be configured to execute one or more computer program modules that are the same as or similar to the computer program modules of server(s) 102 to facilitate virtual item promotions via time-period-based virtual item benefits.

Game module 106 may be configured to execute a game instance of a game space. In some implementations, the game space may be a virtual space. As such, a game instance of the game space may be an instance of the virtual space. A space module (not shown for illustrative convenience) may be configured to implement the instance of the virtual space executed by the computer modules to determine state of the virtual space. The state may then be communicated (e.g., via streaming visual data, via object/position data, and/or other state information) from server(s) 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by the space module is not intended to be limiting. The space module may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by the space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space. In some implementations, the "inventory" of virtual goods may include virtual containers. As an example, virtual containers may include boxes, chests, bundles, packages, or other items that at least "appear" to store or contain one or more other virtual items.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through the space module).

Item manager module 108 may be configured to generate virtual items associated with in-space benefits. The generated virtual items may include a first virtual item, virtual containers, or other virtual items. As an example, item instances of the first virtual item may be configured to be activated by the users in the game space to obtain one or more first in-space benefits.

Store module 110 may be configured to present a store interface to the users. The store interface may present offers to the users to purchase item instances of the virtual items associated with in-space benefits. The presented offers may, for example, include offers to purchase one or more of the item instances of the first virtual item.

Figure 2A:
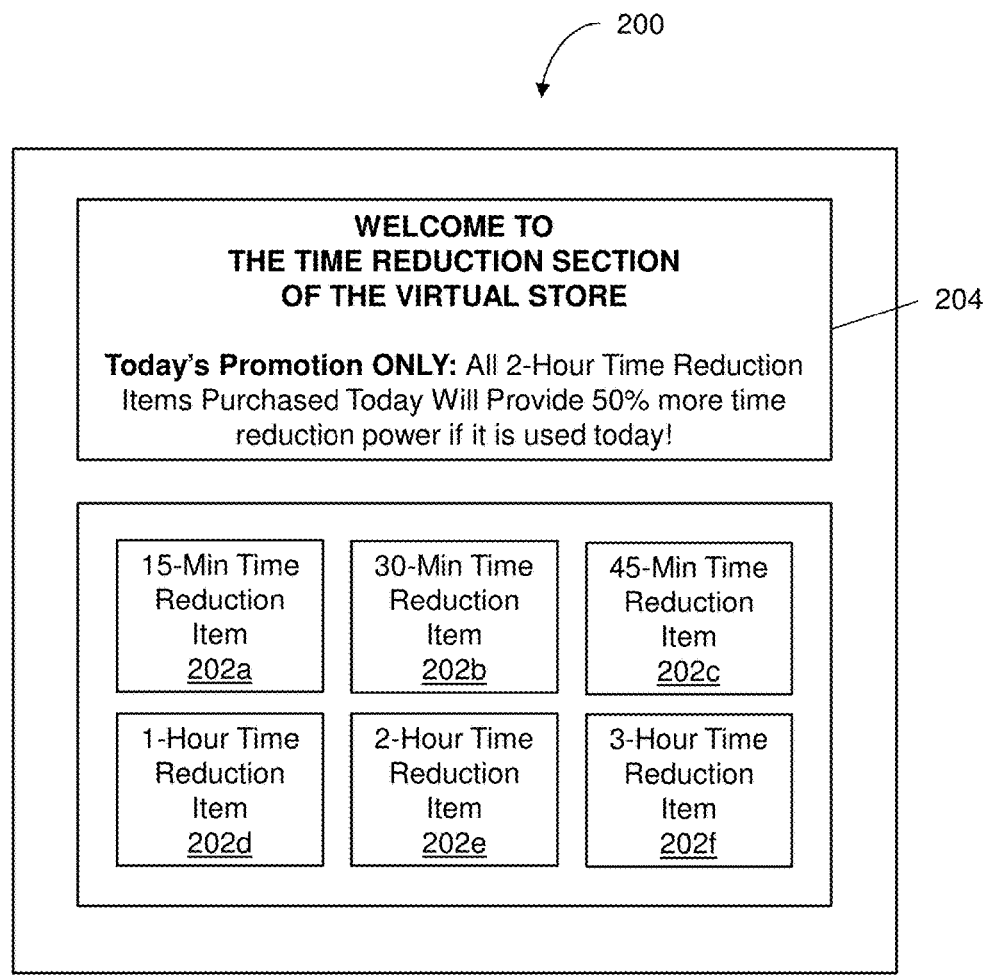
FIGS. 2A-2C illustrate a store interface that presents virtual items and promotional notifications relating to time-period-based virtual item benefits, in accordance with one or more implementations.
Figure 2B:
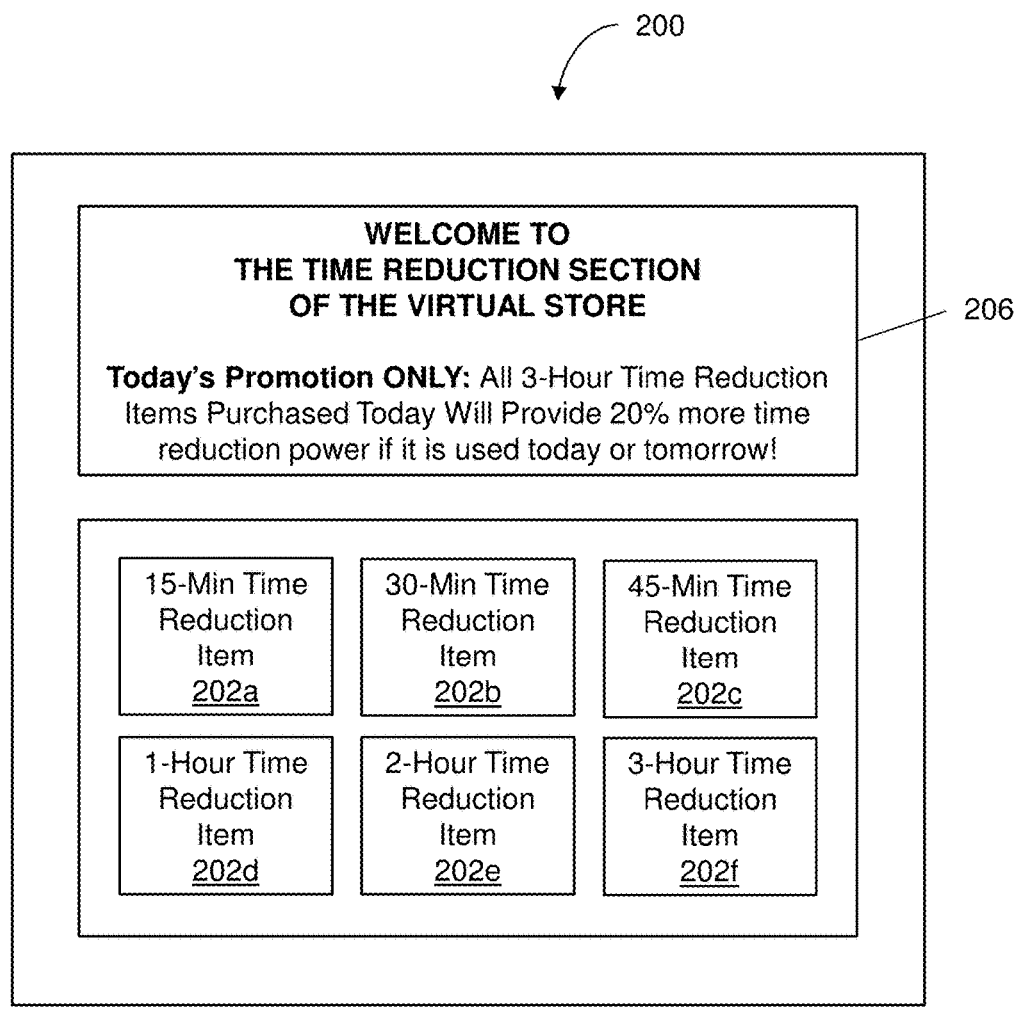
Figure 2C:
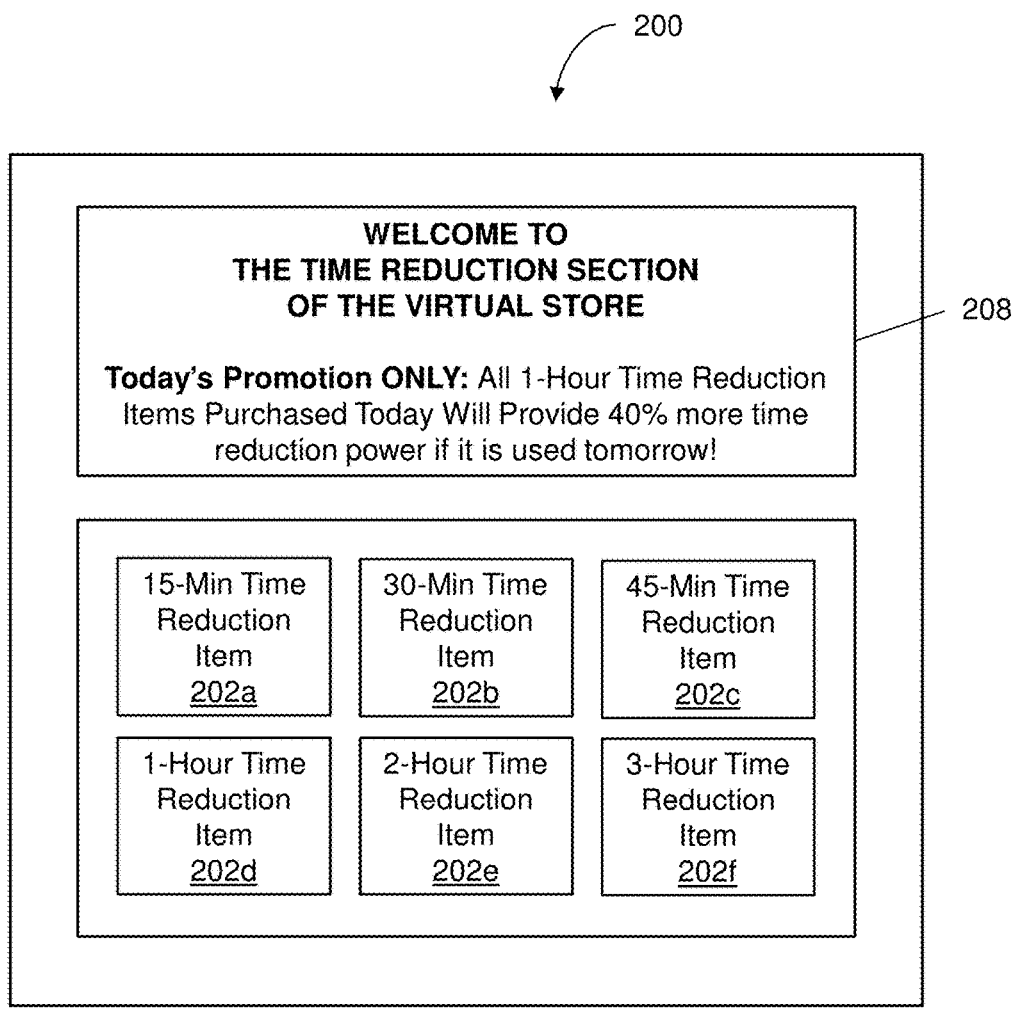

By way of example, FIGS. 2A-2C illustrate a store interface 200 that presents virtual items 202 (e.g., virtual items 202a, 202b, 202c, 202d, 202e, and 202f) and promotional notifications 204, 206, and 208 relating to time-period-based virtual item benefits, in accordance with one or more implementations. It should be noted that notifications 204, 206, and 208 may represent notifications of sales promotions on the same day or on different days. It should be noted that, although various implementations are described with respect to time reduction items, other virtual items associated with in-space benefits are contemplated.

As shown in FIG. 2A, for example, store interface 200 may place item instances of virtual items 202 and other virtual items on sale for purchase by users in the game space. Item instances of virtual items 202 that are purchasable via store interface 200 may include item instances of time reduction items or other virtual items. In one use case, item instances of Time Reduction Items 202 may be activated by users to reduce the amount of time for performance of an operation in the game space. As an example, a user may initiate construction of a building that typically takes 20 minutes. However, the user may utilize an item instance of a 15-Minute Time Reduction Item 202a to reduce the construction time from 20 minutes to 5 minutes.

Promotion module 112 may be configured to manage a promotion that is conducted for the game space. Promotion module 112 may be configured to manage the promotion such that, during a first promotion time period, item instances of the first virtual item purchased through the store interface are modified instances of the first virtual item. The modified instances may be configured to be activated by the users in the game space during a second promotion time period to obtain one or more second in-space benefits. The one or more second in-space benefits may be different from the one or more first in-space benefits.

With respect to FIG. 2A, for example, item instances of 2-Hour Time Reduction Item 202e that are purchased via store interface 200 may typically provide up to 2 hours of time reduction. In one use case, as indicated by notification 204, promotion module 112 may manage a promotion such that all item instances of 2-Hour Time Reduction Item 202e purchased on the day that notification 204 is depicted on store interface 200 will provide 50% more time reduction power (e.g., total of up to 3 hours of time reduction) if the purchased item instance is used on the same day. All item instances of 2-Hour Time Reduction Item 202e purchased after that day will provide up to 2 hours of time reduction. As such, users may be incentivized to purchase an item instance of 2-Hour Time Reduction Item 202e on the same day as the presentation of notification 204 because of the increased in-space benefits, and utilize their purchased item instances on the same day so that the increased in-space benefits are not lost. In this way, for example, the perceived value of a regular 2-Hour Time Reduction Item 202e or other virtual item by the users in the game space may not be affected because the increased in-space benefits may be limited to an activation time period. Future sales of item instances of 2-Hour Time Reduction Item 202e or other virtual items may not be affected because the purchased item instances will likely be used by the users during the activation time period to obtain the increased in-space benefits, creating a need for more virtual items (e.g., a need for more Time Reduction Items 202 or other virtual items). Thus, short-term sales of item instances of 2-Hour Time Reduction Item 202e may be increased while any negative effects associated with traditional sales promotions may be eliminated or otherwise reduced.

In certain implementations, promotion module 112 may be configured such that the first promotion time period is overlapping with the second promotion time period. In one scenario, with respect to FIG. 2A, the time period to purchase an item instance of 2-Hour Time Reduction Item 202e having a 50% increase of time reduction power is "today," while the time period to activate the purchased item instance is "today." In another scenario, with respect to FIG. 2B, the time period to purchase an item instance of 3-Hour Time Reduction Item 202f having a 20% increase of time reduction power is "today," while the time period to activate the purchased item instance is "today and tomorrow." In both scenarios, the purchase time periods are overlapping with the activation time periods.

In various implementations, promotion module 112 may be configured such that the first promotion time period is overlapping with the second promotion time period. In one scenario, with respect to FIG. 2C, the time period to purchase an item instance of 1-Hour Time Reduction Item 202d having a 40% increase of time reduction power is "today," while the time period to activate the purchased item instance is "tomorrow." As such, the purchase time period is not overlapping with the activation time period.

In some implementations, exchange module 114 may be configured to provide at least some of the item instances of the first virtual item to the users that requested an item instance of the first virtual item in exchange for consideration associated with a price of an item instance of the first virtual item. Exchange module 114 may be configured to provide at least some of the modified instances to the users that requested a modified instance of the first virtual item in exchange for consideration associated with a price of a modified instance of the first virtual item. In one scenario, for example, users may initiate a request for a modified instance of the first virtual item by initiating a request for an item instance of the first virtual item during the first promotion time period.

Referring to FIG. 2A, for example, users that ordered an item instance of Time Reduction Item 202e during the purchase time period (e.g., "today") may pay a price associated with Time Reduction Item 202e. In exchange, exchange module 114 may provide the ordered item instances to the users by putting the ordered item instances in "inventories" associated with the users. The users may obtain the increased in-space benefits by selecting an item instance of Time Reduction Item 202e that they purchased during the purchase time period and activating the selected item instance during the activation time period (e.g., "today").

Benefit module 116 may be configured to provide the one or more second in-space benefits to a user within the game space responsive to a determination that at least one of the modified instances is activated by the user during the second promotion time period. With respect to FIG. 2A, for example, benefit module 116 may determine whether an activation of an item instance of Time Reduction Item 202e purchased during the purchase time period (e.g., "today") is during the activation time period (e.g., "today") responsive to the activation of an item instance of Time Reduction Item 202e. Upon determining that the activation is performed during the activation time period, benefit module 116 may apply up to 3 hours of time reduction to the performance of a game space operation of an activating user's choice.

In some implementations, promotion module 112 may be configured such that the modified instances are configured to be activated by the users in the game space during time periods other than the second promotion time period to obtain the one or more first in-space benefits. Benefit module 116 may be configured to provide the one or more first in-space benefits to the user responsive to a determination that at least one of the modified instances is activated by the user during a time period other than the second promotion time period.

In one scenario, with respect to FIG. 2A, item instances of Time Reduction Item 202e that are purchasable during the purchase time period (e.g., "today") may be configured such that activation of an item instance of Time Reduction Item 202e during a time period other than the activation time period (e.g., "today") associated with the increased in-space benefits may result in up to 2 hours of time reduction being applied to the performance of a game space operation of an activating user's choice (e.g., as opposed to the increased in-space benefit of up to 3 hours of time reduction).

In certain implementations, promotion module 112 may be configured such that the modified instances are configured to be activated by the users in the game space during time periods other than the second promotion time period to obtain the one or more third in-space benefits. The one or more third in-space benefits may be different than the one or more first in-space benefits and the one or more second in-space benefits. Benefit module 116 may be configured to provide the one or more third in-space benefits to the user responsive to a determination that at least one of the modified instances is activated by the user during a time period other than the second promotion time period.

By way of example, with respect to FIG. 2A, item instances of Time Reduction Item 202e that are purchasable during the purchase time period (e.g., "today") may be configured such that activation of an item instance of Time Reduction Item 202e during a time period other than the activation time period (e.g., "today") associated with the increased in-space benefits may result in up to 1 hours of time reduction being applied to the performance of a game space operation of an activating user's choice (e.g., as opposed to the regular in-space benefit of up to 2 hours of time reduction or the increased in-space benefit of up to 3 hours of time reduction).

In various implementations, store module 110 may be configured such that the virtual items include virtual containers. The virtual containers may include a first virtual container. Individual ones of container instances of the first virtual container may be configured to be activated by the users in the game space to obtain a modified instance of the first virtual item and one or more item instances of other virtual items.

Figure 3:
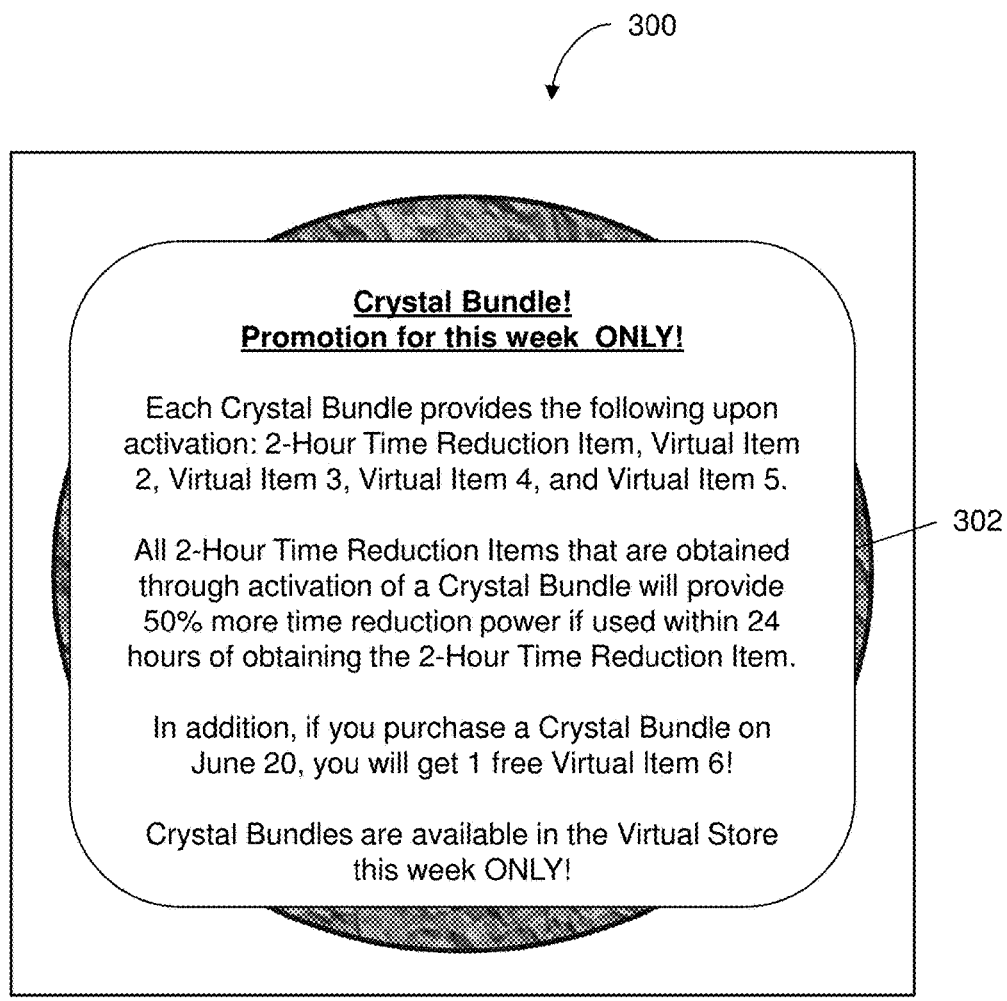
FIG. 3 illustrates a user interface that depicts a promotional notification relating to a virtual container through which time-period-based virtual item benefits are obtainable, in accordance with one or more implementations.

For example, FIG. 3 illustrates a user interface 300 that depicts a promotional notification 302 relating to a virtual container through which time-period-based virtual item benefits are obtainable, in accordance with one or more implementations. As indicated by notification 302, each container instance of a Crystal Bundle may be configured to be activated by the users in the game space to obtain an item instance (e.g., a modified instance) of a 2-Hour Time Reduction Item, an item instance of a Virtual Item 2, an item instance of a Virtual Item 3, an item instance of a Virtual Item 4, and an item instance of a Virtual Item 5. All item instances of the 2-Hour Time Reduction Item that are obtained through activation of a container instance of the Crystal Bundle may provide 50% more time reduction power (e.g., up to 3 hours of time reduction) if the item instances of the 2-Hour Time Reduction Item are used within 24 hours of being obtained via a container instance of the Crystal Bundle.

In some implementations, the other virtual items may include the first virtual item such that individual ones of the container instances are configured to be activated by the users in the game space to obtain a plurality of modified instances of the first virtual item. In one scenario, for example, individual ones of container instances of a Diamond Bundle may be configured to be activated by the users of the game space to obtain 2 item instances of the 2-Hour Time Reduction Item. Each of the 2 item instances of the 2-Hour Time Reduction Item that are obtained through activation of a container instance of the Diamond Bundle may provide 50% more time reduction power (e.g., up to 3 hours of time reduction) if the item instance of the 2-Hour Time Reduction Item is used within 24 hours of being obtained via a container instance of the Diamond Bundle.

In certain implementations, the other virtual items may not include the first virtual item. With respect to FIG. 3, for example, each container instance of the Crystal Bundle may be configured to be activated by the users in the game space to obtain an item instance (e.g., a modified instance) of the 2-Hour Time Reduction Item along with at least one item instance of at least another virtual item that is not the 2-Hour Time Reduction Item (e.g., an item instance of a Virtual Item 2, an item instance of a Virtual Item 3, an item instance of a Virtual Item 4, and an item instance of a Virtual Item 5). As indicated, all item instances of the 2-Hour Time Reduction Item that are obtained through activation of a container instance of the Crystal Bundle may provide 50% more time reduction power (e.g., up to 3 hours of time reduction) if the item instances of the 2-Hour Time Reduction Item are used within 24 hours of being obtained via a container instance of the Crystal Bundle.

In various implementations, exchange module 114 may be configured to provide at least some of the container instances of the first virtual container to the users that requested a container instance of the first virtual container in exchange for consideration associated with a price of a container instance of the first virtual container. In one use case, with respect to FIG. 3, users that ordered a container instance of the Crystal Bundle during the promotion week may pay a price associated with the Crystal Bundle. In exchange, exchange module 114 may provide the ordered container instances to the users by putting the ordered container instances in "inventories" associated with the users.

In some implementations, exchange module 114 may be configured such that the price of a container instance of the first virtual container is different from a total sum of prices of a modified instance of the first virtual item and the one or more item instances of the other virtual items. In one scenario, with respect to FIG. 3, the price of an item instance of the 2-Hour Time Reduction Item in the game space may be 20 Gems, the price of an item instance of the Virtual Item 2 in the game space may be 5 Gems, the price of an item instance of the Virtual Item 3 in the game space may be 5 Gems, the price of an item instance of the Virtual Item 4 in the game space may be 5 Gems, and the price of an item instance of the Virtual Item 5 in the game space may be 5 Gems. As such, the total sum of prices to individually purchase the 5 different item instances may be 40 Gems. To make item instances of the Crystal Bundle more appealing to users, for example, exchange module 114 may set the price of a container instance of the Crystal Bundle to be less than the total sum of the prices to individually purchase the 5 different item instances (e.g., price of a container instance of the Crystal Bundle may be 75% of the total sum of prices or other price that is less than the total sum of the prices).

In certain implementations, exchange module 114 may be configured to provide one or more additional item instances of the virtual items to the users that requested a container instance of the first virtual container responsive to a determination that requests for the at least some of the container instances are initiated during a third promotion time period. For example, with respect to FIG. 3, users that ordered a container instance of the Crystal Bundle on June 20 of the promotion week may be provided with an item instance of Virtual Item 6 at no additional charge.

Server(s) 102, client computing platforms 104, external resources 118, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 118, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 118, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 118 may include sources of information, hosts and/or providers of virtual spaces outside of system 100, external entities participating with system 100, and/or other resources. In some implementations, some or all of the functionality attributed herein to external resources 118 may be provided by resources included in system 100.

In some implementations, server(s) 102 may include an electronic storage 120, one or more processor(s) 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platforms 104, and/or other information that enables server(s) 102 to function as described herein.

Processor(s) 122 is configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute modules 106, 108, 110, 112, 114, 116, and/or other modules. Processor(s) 122 may be configured to execute modules 106, 108, 110, 112, 114, 116, and/or other modules by software; hardware; firmware; some combination of software, hardware, and/or firmware; and/or other mechanisms for configuring processing capabilities on processor(s) 122. As noted, in certain implementations, a given client computing platform 104 may include one or more computer program modules that is the same as or similar to the computer program modules of server(s) 102. Client computing platform 104 may include one or more processors that are the same or similar to processor(s) 122 of server(s) 102 to execute such computer program modules of client computing platform 104.

It should be appreciated that although modules 106, 108, 110, 112, 114, and 116 are illustrated in FIG. 1 as being co-located within a single processing unit, in implementations in which processor(s) 122 includes multiple processing units, one or more of modules 106, 108, 110, 112, 114, and/or 116 may be located remotely from the other modules. The description of the functionality provided by the different modules 106, 108, 110, 112, 114, and/or 116 described below is for illustrative purposes, and is not intended to be limiting, as any of modules 106, 108, 110, 112, 114, and/or 116 may provide more or less functionality than is described. For example, one or more of modules 106, 108, 110, 112, 114, and/or 116 may be eliminated, and some or all of its functionality may be provided by other ones of modules 106, 108, 110, 112, 114, and/or 116. As another example, processor(s) 122 may be configured to execute one or more additional modules that may perform some or all of the functionality attributed below to one of modules 106, 108, 110, 112, 114, and/or 116.

Figure 4:
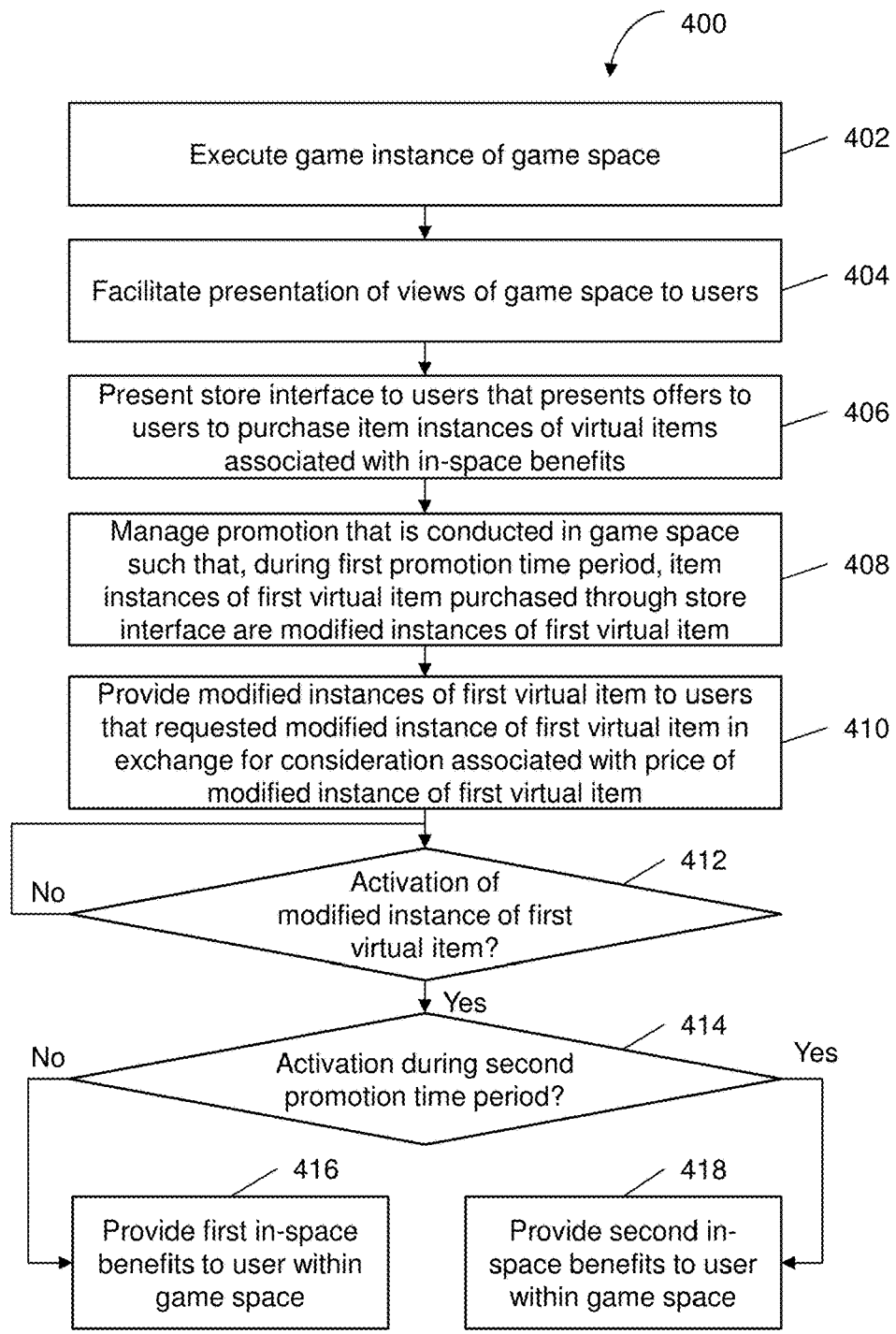
FIG. 4 illustrates a method of facilitating virtual item promotions via time-period-based virtual item benefits, in accordance with one or more implementations.

FIG. 4 illustrates a method of facilitating virtual item promotions via time-period-based virtual item benefits, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a game instance of a game space may be executed. Operation 402 may be performed by a game module that is the same as or similar to game module 106, in accordance with one or more implementations.

At an operation 404, presentation of views of the game space to users may be facilitated. The game space may be configured to facilitate interaction of the users with the game space and/or each other by performing operations in the game space in response to commands received from the users. Operation 404 may be performed by a game module that is the same as or similar to game module 106, in accordance with one or more implementations.

At an operation 406, a store interface may be presented to the users. The store interface may present offers to the users to purchase item instances of virtual items associated with in-space benefits. The virtual items may include a first virtual item. Item instances of the first virtual item may be configured to be activated by the users in the game space to obtain one or more first in-space benefits. Operation 406 may be performed by a store module that is the same as or similar to store module 110, in accordance with one or more implementations.

At an operation 408, a promotion that is conducted for the game space may be managed. The promotion may be managed such that, during a first promotion time period, item instances of the first virtual item purchased through the store interface are modified instances of the first virtual item. The modified instances may be configured to be activated by the users in the game space during a second promotion time period to obtain one or more second in-space benefits. The one or more second in-space benefits may be different from the one or more first in-space benefits. In certain implementations, the modified instances may be configured to be activated by the users in the game space during time periods other than the second promotion time period to obtain the one or more first in-space benefits. In various implementations, the first promotion time period may be overlapping with the second promotion time period. In some implementations, the first promotion time period may not be overlapping with the second promotion time period. Operation 408 may be performed by a promotion module that is the same as or similar to promotion module 112, in accordance with one or more implementations.

At an operation 410, at least some of the modified instances may be provided to the users that requested a modified instance of the first virtual item in exchange for consideration associated with a price of a modified instance of the first virtual item. Operation 410 may be performed by an exchange module that is the same as or similar to exchange module 114, in accordance with one or more implementations.

At an operation 412, a determination of whether at least one of the modified instances has been activated may be effectuated. Operation 412 may be performed by a benefit module that is the same as or similar to benefit module 116, in accordance with one or more implementations. Responsive to a determination that the at least one of the modified instances has been activated, method 400 may proceed to an operation 414.

At operation 414, a determination of whether the activation of the at least one of the modified instances was during the second promotion time period may be effectuated. Operation 414 may be performed by a benefit module that is the same as or similar to benefit module 116, in accordance with one or more implementations. Responsive to a determination that the activation of the at least one of the modified instances was not during the second promotion time period, method 400 may proceed to an operation 416. Responsive to a determination that the activation of the at least one of the modified instances was during the second promotion time period, method 400 may proceed to an operation 418.

At operation 416, the one or more first in-space benefits may be provided to the user (that activated the at least one of the modified instances) within the game space. As indicated, in some implementations, the one or more first in-space benefits may be provided to the user responsive to a determination that the user activated the at least one of the modified instances during a time period other than the second promotion time period. Operation 416 may be performed by a benefit module that is the same as or similar to benefit module 116, in accordance with one or more implementations.

At operation 418, the one or more second in-space benefits may be provided to the user (that activated the at least one of the modified instances) within the game space. As indicated, the one or more second in-space benefits may be provided to the user responsive to a determination that the user activated the at least one of the modified instances during the second promotion time period. Operation 418 may be performed by a benefit module that is the same as or similar to benefit module 116, in accordance with one or more implementations.

Figure 5:
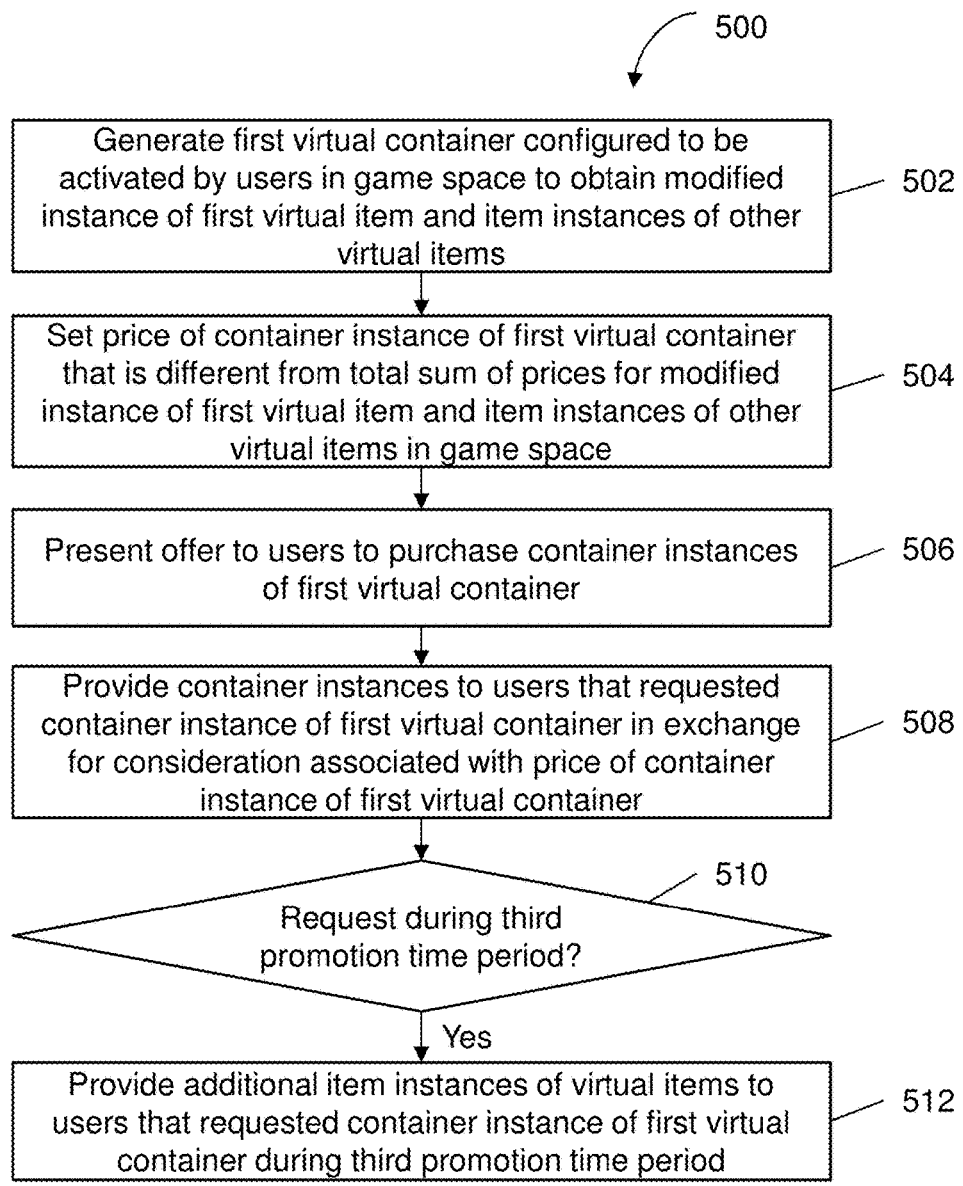
FIG. 5 illustrates a method of facilitating virtual item promotions via virtual containers, in accordance with one or more implementations.

FIG. 5 illustrates a method of facilitating virtual item promotions via virtual containers, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

As discussed, in certain implementations, offers to purchase item instances of virtual items associated with in-space benefits may be presented to users of a game space via a store interface. The virtual items may include a first virtual item. Item instances of the first virtual item may be configured to be activated by the users in the game space to obtain one or more first in-space benefits. Item instances of the first virtual item that are purchased through the store interface during a first promotion time period may be modified instances of the first virtual item. The modified instances of the first virtual item may be configured to be activated by the users in the game space during a second promotion time period to obtain one or more second in-space benefits.

At an operation 502, a first virtual container configured to be activated by the users in the game space to obtain a modified instance of the first virtual item and one or more item instances of other virtual items may be generated. Operation 502 may be performed by an item manager module that is the same as or similar to item manager module 108, in accordance with one or more implementations.

At an operation 504, a price of a container instance of the first virtual container may be set. The price of the container instance of the first virtual container may be set such that the price of the container instance is different from a total sum of prices for a modified instance of the first virtual item and the one or more item instances of the other virtual items in the game space. Operation 504 may be performed by an exchange module that is the same as or similar to exchange module 114, in accordance with one or more implementations.

At an operation 506, an offer may be presented to the users to purchase the container instances of the first virtual container. In some implementations, the offer may be presented to the users in the game space via the store interface. Operation 506 may be performed by a store module that is the same as or similar to store module 110, in accordance with one or more implementations.

At an operation 508, the container instances of the first virtual container may be provided to the users that requested a container instance of the first virtual container in exchange for consideration associated with the price of a container instance of the first virtual container. Operation 508 may be performed by an exchange module that is the same as or similar to exchange module 114, in accordance with one or more implementations.

At an operation 510, a determination of whether one or more requests for the container instances of the first virtual container was initiated by the users during a third promotion period. In some implementations, the third promotion period may be associated with an award of one or more additional item instances of the virtual items associated with the in-space benefits. Operation 510 may be performed by a promotion module that is the same as or similar to promotion module 112, in accordance with one or more implementations. Responsive to a determination that one or more requests for the container instances of the first virtual container was initiated by the users during the third promotion period, method 500 may proceed to an operation 512.

At operation 512, the one or more additional item instances of the virtual items may be provided to the users that requested a container instance of the first virtual container during the third promotion time period. Operation 512 may be performed by a exchange module that is the same as or similar to exchange module 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing time-period-based virtual item benefits within a game space, the system comprising:
   one or more processors configured by machine-readable instructions to:
      execute a game instance of the game space, and to use the game instance to facilitate interaction of users with the game space and/or each other by transmitting state information derived from execution of the game instance over a network to client computing platforms associated with the users for presentation of views of the game space to the users on the associated client computing platforms and performing operations in the game space in response to commands received from the client computing platforms associated with the users;
      cause presentation of an interface to the users including a first user and a second user, wherein the interface is configured to present offers to the users to purchase item instances of virtual items associated with in-space benefits, the virtual items including a first virtual item, wherein individual ones of the item instances of the virtual items are either (i) an unmodified version of a particular item instance of a particular virtual item, or (ii) a modified version of the particular item instance of the particular virtual item,
      wherein the item instances of the first virtual item are unmodified versions that are configured to be activated by the users in the game space to obtain one or more first in-space benefits,
      wherein the item instances of the first virtual item purchased via the interface during a first time period are modified versions that are configured to be activated by the users in the game space during a second time period to obtain one or more second in-space benefits, wherein the first time period has a first start time and a first end time and the second time period has a second start time and a second end time, and wherein the one or more second in-space benefits are different from the one or more first in-space benefits that would be obtained by the users in the game space upon activation of unmodified versions of the item instances of the first virtual item;
      cause presentation, via the interface, of the offers to purchase the first virtual item during the first time period to the users, wherein the first user purchases a first item instance of the first virtual item during the first period, wherein the first item instance is a modified version;
      cause presentation, via the interface, of the offers to purchase the first virtual item outside the first time period to the users, wherein the second user purchases a second item instance of the first virtual item outside the first time period, wherein the second item instance is an unmodified version;
      cause presentation, via the interface, of information informing the users of the second time period including the second start time and the second end time of the second time period and modification of the instances of the first virtual item during the second time period;
      provide the one or more first in-space benefits to the second user within the game space responsive to a determination that the second item instance is activated by the second user; and
      provide the one or more second in-space benefits to the first user within the game space responsive to a determination that the first item instance is activated by the first user during the second time period.

2. The system of claim 1, wherein the one or more processors are further configured by machine-readable instructions such that the modified versions of the item instances are configured to be activated by the users in the game space during time periods other than the second time period to obtain the one or more first in-space benefits, and wherein the one or more first in-space benefits are provided to the first user responsive to a determination that at least one of the modified versions of individual item instances is activated by the first user during a time period other than the second time period.

3. The system of claim 1, wherein the one or more processors are further configured by machine-readable instructions such that the first time period is overlapping with the second time period.

4. The system of claim 1, wherein the one or more processors are further configured by machine-readable instructions such that the first time period is not overlapping with the second time period.

5. The system of claim 1, wherein the one or more processors are further configured by machine-readable instructions to provide at least some of the modified versions of item instances to the users that requested a modified version of a particular item instance of the first virtual item in exchange for consideration.

6. The system of claim 1, wherein the one or more processors are further configured by machine-readable instructions such that the virtual items include virtual containers, wherein the virtual containers include a first virtual container, and wherein individual ones of container instances of the first virtual container are configured to be activated by the users in the game space to obtain a modified version of a particular item instance of the first virtual item and one or more item instances of other virtual items.

7. The system of claim 6, wherein the other virtual items include the first virtual item such that individual ones of the container instances are configured to be activated by the users in the game space to obtain a plurality of modified versions of particular item instances of the first virtual item.

8. The system of claim 6, wherein the other virtual items do not include the first virtual item.

9. The system of claim 6, wherein the one or more processors are further configured by machine-readable instructions to provide at least some of the container instances of the first virtual container to the users that requested a container instance of the first virtual container in exchange for consideration associated with a price of a container instance of the first virtual container.

10. The system of claim 9, wherein the one or more processors are further configured by machine-readable instructions such that the price of a container instance of the first virtual container is different from a total sum of prices of a modified version of a particular item instance of the first virtual item and the one or more item instances of the other virtual items.

11. The system of claim 9, wherein the one or more processors are further configured by machine-readable instructions to provide one or more additional item instances of the virtual items to the users that requested a container instance of the first virtual container responsive to a determination that requests for the at least some of the container instances are initiated during a third time period.

12. A computer-implemented method for providing time-period-based virtual item benefits within a game space, the method being implemented on a computer system that includes one or more physical processors, the method comprising:

executing a game instance of the game space;

using the game instance to facilitate interaction of the users with the game space and/or each other by transmitting state information derived from execution of the game instance to client computing platforms associated with the users for presentation of views of the game space to the users on the associated client computing platforms and performing operations in the game space in response to commands received from the client computing platforms associated with the users;

causing presentation of an interface to the users including a first user and a second user, wherein the interface is configured to present offers to users to purchase item instances of virtual items associated with in-space benefits, the virtual items including a first virtual item, wherein individual ones of the item instances of the virtual items are either (i) an unmodified version of a particular item instance of a particular virtual item, or (ii) a modified version of the particular item instance of the particular virtual item, wherein the item instances of the first virtual item are unmodified versions that are configured to be activated by the users in the game space to obtain one or more first in-space benefits, wherein the item instances of the first virtual item purchased via the interface during a first time period are modified versions that are configured to be activated by the users in the game space during a second time period to obtain one or more second in-space benefits, wherein the first time period has a first start time and a first end time and the second time period has a second start time and a second end time, and wherein the one or more second in-space benefits are different from the one or more first in-space benefits that would be obtained by the users in the game space upon activation of unmodified versions of the item instances of the first virtual item;

causing presentation, via the interface, of the offers to purchase the first virtual item during the first time period to the users, wherein the first user purchases a first item instance of the first virtual item during the first period, wherein the first item instance is a modified version;

causing presentation, via the interface, of the offers to purchase the first virtual item outside the first time period to the users, wherein the second user purchases a second item instance of the first virtual item outside the first time period, wherein the second item instance is an unmodified version;

cause presentation, via the interface, of information informing the users of the second time period including the second start time and the second end time of the second time period and modification of the instances of the first virtual item during the second time period;

providing the one or more first in-space benefits to the second user within the game space responsive to a determination that the second item instance is activated by the second user; and providing the one or more second in-space benefits to the first user within the game space responsive to a determination that the first item instance is activated by the first user during the second time period.

13. The method of claim 12, wherein the modified versions of the item instances are configured to be activated by the users in the game space during time periods other than the second time period to obtain the one or more first in-space benefits, the method further comprising providing the one or more first in-space benefits to the first user responsive to a determination that at least one of the modified versions of individual item instances is activated by the first user during a time period other than the second time period.

14. The method of claim 12, wherein the first time period is overlapping with the second time period.

15. The method of claim 12, wherein the first time period is not overlapping with the second time period.

16. The method of claim 12, further comprising providing at least some of the modified versions of item instances to the users that requested a modified version of a particular item instance of the first virtual item in exchange for consideration.

17. The method of claim 12, wherein the virtual items include virtual containers, wherein the virtual containers include a first virtual container, and wherein individual ones of container instances of the first virtual container are configured to be activated by the users in the game space to obtain a modified version of a particular item instance of the first virtual item and one or more item instances of other virtual items.

18. The method of claim 17, further comprising providing at least some of the container instances of the first virtual container to the users that requested a container instance of the first virtual container in exchange for consideration associated with a price of a container instance of the first virtual container.

19. The method of claim 18, wherein the price of a container instance of the first virtual container is different from a total sum of prices for a modified version of a particular item instance of the first virtual item and the one or more item instances of the other virtual items.

20. The method of claim 18, further comprising providing one or more additional item instances of the virtual items to the users that requested a container instance of the first virtual container responsive to a determination that requests for the at least some of the container instances are initiated during a third time period.

* * * * *